United States Patent
Baig et al.

(10) Patent No.: US 12,344,389 B2
(45) Date of Patent: Jul. 1, 2025

(54) ELECTRIC MACHINES FOR AIRCRAFT ENGINE FAULT DETECTION

(71) Applicant: RTX Corporation, Farmington, CT (US)

(72) Inventors: Zubair Ahmed Baig, South Windsor, CT (US); Martin Richard Amari, Glastonbury, CT (US); Michael Winter, New Haven, CT (US)

(73) Assignee: RTX CORPORATION, Farmington, CT (US)

( * ) Notice: Subject to any disclaimer, the term of this patent is extended or adjusted under 35 U.S.C. 154(b) by 278 days.

(21) Appl. No.: 17/846,250

(22) Filed: Jun. 22, 2022

(65) Prior Publication Data

US 2023/0227171 A1 Jul. 20, 2023

Related U.S. Application Data

(60) Provisional application No. 63/220,156, filed on Jul. 9, 2021.

(51) Int. Cl.
*B64D 31/09* (2024.01)
*B64D 31/18* (2024.01)
*B64D 45/00* (2006.01)

(52) U.S. Cl.
CPC ............. *B64D 31/09* (2024.01); *B64D 31/18* (2024.01); *B64D 2045/0085* (2013.01)

(58) Field of Classification Search
CPC . B64D 31/09; B64D 31/18; B64D 2045/0085
See application file for complete search history.

(56) References Cited

U.S. PATENT DOCUMENTS

| | | | |
|---|---|---|---|
| 2020/0130853 A1* | 4/2020 | Stuckey | F02K 5/00 |
| 2020/0277064 A1 | 9/2020 | Thomassin et al. | |
| 2021/0101691 A1 | 4/2021 | Mark et al. | |
| 2022/0097864 A1* | 3/2022 | Baladi | F02C 6/08 |

FOREIGN PATENT DOCUMENTS

WO 2016193603 A1 12/2016

OTHER PUBLICATIONS

Aug. 9, 2020 https://byjus.com/physics/relation-between-torque-and-speed/ (Year: 2020).*

* cited by examiner

*Primary Examiner* — Todd E Manahan
*Assistant Examiner* — Rodolphe Andre Chabreyrie
(74) *Attorney, Agent, or Firm* — CANTOR COLBURN LLP

(57) ABSTRACT

Methods and systems for monitoring operation of hybrid electric engines of aircraft. The methods include monitoring a motor condition of an electrical power system associated with an engine condition using a motor sensor, wherein the electrical power system comprises an electric machine operably coupled to at least one shaft of an engine core, wherein the electric machine is configured to at least one of add power to the at least one shaft and extract power from the at least one shaft, receiving motor data from the motor sensor at a motor controller, wherein the motor controller is configured to control operation of, at least, the electric machine, analyzing the motor data to determine the presence of a fault in the engine core, and, when a fault is detected, performing a fault response action.

8 Claims, 12 Drawing Sheets

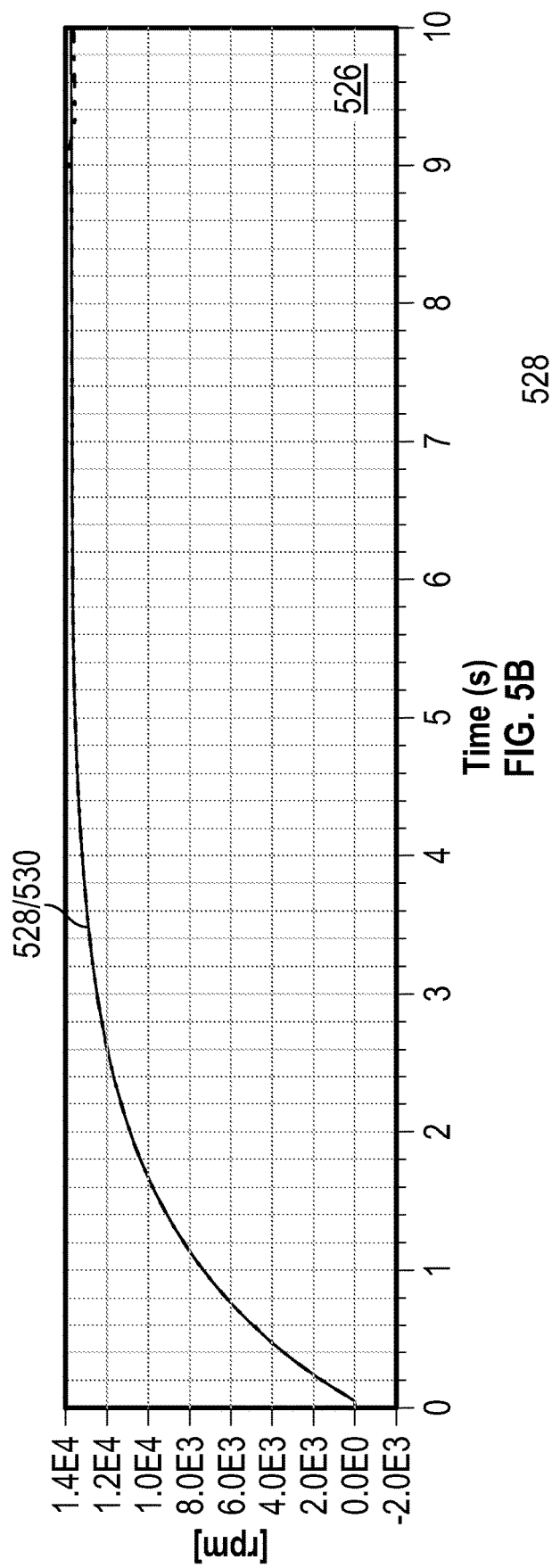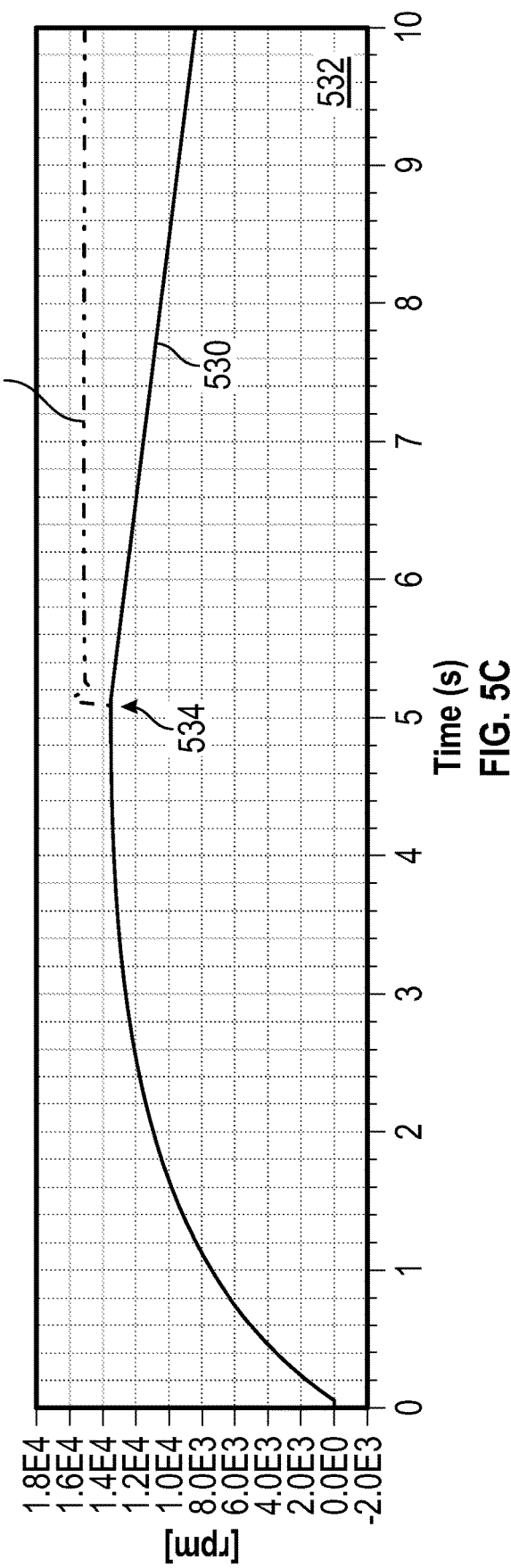
FIG. 5B
FIG. 5C

ELECTRIC MACHINES FOR AIRCRAFT ENGINE FAULT DETECTION

CROSS-REFERENCE TO RELATED APPLICATIONS

This application claims the benefit of U.S. Provisional Application No. 63/220,156, filed Jul. 9, 2021, the disclosure of which is incorporated herein by reference in its entirety.

BACKGROUND

The subject matter disclosed herein generally relates to hybrid electric aircraft, and more particularly, to aircraft hybrid electric gas turbine engine systems.

Hybrid electric aircraft use electricity to provide a portion of the power needed for propulsion by converting electricity into a propulsive force. Such supplemental power is achieved by coupling an electric machine to one or more spools of a gas turbine engine. Typical gas turbine engines include sensors to detect failures of components thereof (e.g., shafts of the engine). Improved sensing systems are beneficial to monitoring engine health and component life.

BRIEF DESCRIPTION

According to some embodiment, methods for monitoring operation of hybrid electric engines of aircraft are provided. The methods include monitoring a motor condition of an electrical power system associated with an engine condition using a motor sensor, wherein the electrical power system comprises an electric machine operably coupled to at least one shaft of an engine core, wherein the electric machine is configured to at least one of add power to the at least one shaft and extract power from the at least one shaft, receiving motor data from the motor sensor at a motor controller, wherein the motor controller is configured to control operation of, at least, the electric machine, analyzing the motor data to determine the presence of a fault in the engine core, and, when a fault is detected, performing a fault response action.

In addition to one or more of the features described herein, or as an alternative, further embodiments of the methods may include that the motor data comprises electrical current data and the associated engine condition is a health of a gear system that connects the electric machine to the at least one shaft.

In addition to one or more of the features described herein, or as an alternative, further embodiments of the methods may include that a natural frequency of operation is monitored and a fault is detected when a secondary peak frequency is detected that is different from the natural frequency.

In addition to one or more of the features described herein, or as an alternative, further embodiments of the methods may include that when the secondary peak frequency is below a threshold amplitude a first fault state is detected and if the secondary peak frequency is above the threshold amplitude a second fault state is detected, wherein the second fault state indicates a failure of the gear system.

In addition to one or more of the features described herein, or as an alternative, further embodiments of the methods may include collecting engine data from at least one engine sensor onboard the engine core, receiving the engine data at the motor controller, and comparing the engine data with the motor data. A fault is detected based on the comparison between the engine data and the motor data.

In addition to one or more of the features described herein, or as an alternative, further embodiments of the methods may include that the at least one engine sensor is configured to monitor a rotational speed of the at least one shaft and the engine data is the rotational speed of the at least one shaft.

In addition to one or more of the features described herein, or as an alternative, further embodiments of the methods may include that the motor data is a rotational speed of the electric machine, and the detection of a fault is based on comparison between the rotational speed of the at least one shaft and the rotational speed of the electric machine.

In addition to one or more of the features described herein, or as an alternative, further embodiments of the methods may include that the fault response action comprises generating a notification in a cockpit of the aircraft.

In addition to one or more of the features described herein, or as an alternative, further embodiments of the methods may include that the fault response action comprises limiting an operational envelope of the engine core.

According to some embodiments, hybrid electric propulsion systems are provided. The hybrid electric propulsion systems include an engine core comprising a low speed shaft and a high speed shaft, the low speed shaft comprising a low pressure compressor and a low pressure turbine, and the high speed shaft comprising a high pressure compressor and a high pressure turbine, an electrical power system configured to augment rotational power of at least one of the high speed shaft and the low speed shaft, the electrical power system including an electric machine operably coupled to at least one shaft of the engine core, wherein the electric machine is configured to at least one of add power to the at least one shaft and extract power from the at least one shaft, and an engine fault detection system configured to monitor one or more engine conditions. The engine fault detection system includes a motor controller operably connected to the electric machine, at least one motor sensor configured to generate motor data, and the motor controller is configured to monitor the motor data to determine a fault in the engine core.

In addition to one or more of the features described herein, or as an alternative, further embodiments of the hybrid electric propulsion systems may include that the motor data comprises electrical current data and the associated engine condition is a health of a gear system that connects the electric machine to the at least one shaft.

In addition to one or more of the features described herein, or as an alternative, further embodiments of the hybrid electric propulsion systems may include that a natural frequency of operation is monitored and a fault is detected when a secondary peak frequency is detected that is different from the natural frequency.

In addition to one or more of the features described herein, or as an alternative, further embodiments of the hybrid electric propulsion systems may include that when the secondary peak frequency is below a threshold amplitude a first fault state is detected and if the secondary peak frequency is above the threshold amplitude a second fault state is detected, wherein the second fault state indicates a failure of the gear system.

In addition to one or more of the features described herein, or as an alternative, further embodiments of the hybrid electric propulsion systems may include that the motor controller is configured to receive engine data at the motor controller from at least one engine sensor onboard the engine core, compare the engine data with the motor data, and a fault is detected based on the comparison between the engine data and the motor data.

In addition to one or more of the features described herein, or as an alternative, further embodiments of the hybrid electric propulsion systems may include that the at least one engine sensor is configured to monitor a rotational speed of the at least one shaft and the engine data is the rotational speed of the at least one shaft.

In addition to one or more of the features described herein, or as an alternative, further embodiments of the hybrid electric propulsion systems may include that the motor data is a rotational speed of the electric machine, and the detection of a fault is based on comparison between the rotational speed of the at least one shaft and the rotational speed of the electric machine.

In addition to one or more of the features described herein, or as an alternative, further embodiments of the hybrid electric propulsion systems may include that the fault response action comprises generating a notification in a cockpit of the aircraft.

In addition to one or more of the features described herein, or as an alternative, further embodiments of the hybrid electric propulsion systems may include that the fault response action comprises limiting an operational envelope of the engine core.

In addition to one or more of the features described herein, or as an alternative, further embodiments of the hybrid electric propulsion systems may include that the engine core is an engine core of a gas turbine engine.

According to some embodiments, hybrid electric propulsion systems are provided. The hybrid electric propulsion systems include an engine core comprising a low speed shaft and a high speed shaft, the low speed shaft comprising a low pressure compressor and a low pressure turbine, and the high speed shaft comprising a high pressure compressor and a high pressure turbine, an electrical power system configured to augment rotational power of at least one of the high speed shaft and the low speed shaft, the electrical power system including an electric machine operably coupled to at least one shaft of the engine core, wherein the electric machine is configured to at least one of add power to the at least one shaft and extract power from the at least one shaft, and a means for detecting and determining engine faults in the engine core based on one or more signals from the electrical power system.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 5B is a plot of rotational speeds of a shaft and an electric machine of the system of FIG. 5A during normal operation;

FIG. 5C is a plot of rotational speeds of a shaft and an electric machine of the system of FIG. 5A during a failure of the shaft;

DETAILED DESCRIPTION

A detailed description of one or more embodiments of the disclosed apparatus and method are presented herein by way of exemplification and not limitation with reference to the Figures.

Figure 1:
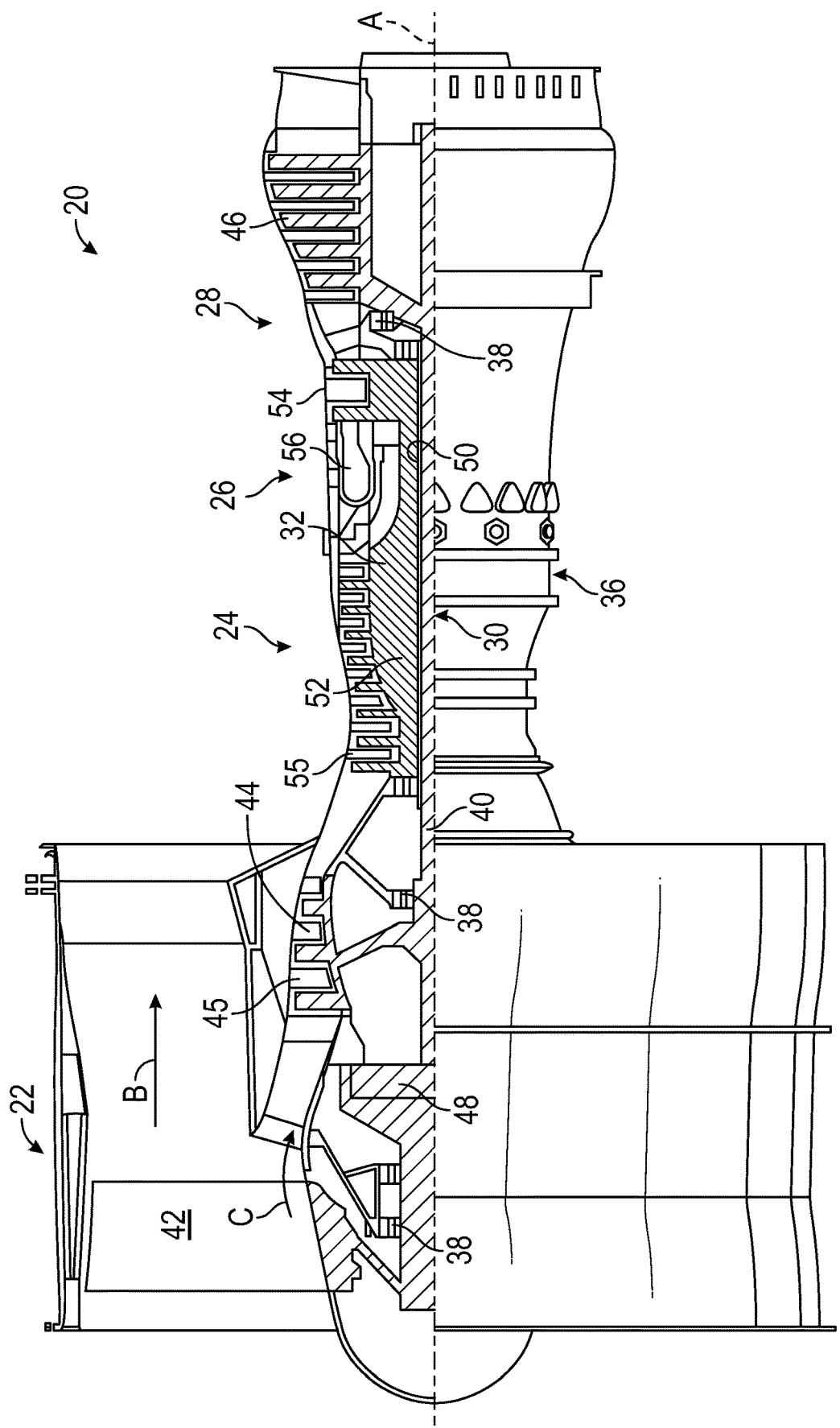
FIG. 1 is a partial cross-sectional illustration of a gas turbine engine, in accordance with an embodiment of the disclosure.

FIG. 1 schematically illustrates a gas turbine engine 20 that may incorporate embodiments of the present disclosure. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct, while the compressor section 24 drives air along a core flow path C for compression, communication into the combustor section 26, and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The gas turbine engine 20, as shown, includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided, and the location of the bearing systems 38 may be varied as appropriate to a specific application and/or engine configuration.

The low speed spool 30, as shown, includes an inner shaft 40 that interconnects a fan 42, a low pressure compressor 44, and a low pressure turbine 46. The inner shaft 40 is connected to the fan 42 through a speed change mechanism, which in the gas turbine engine 20 of the present embodiment is illustrated as a geared architecture 48 that is configured to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. A part of the engine static structure 36 is arranged between the high pressure turbine 54 and the low pressure turbine 46. The engine static structure 36 is configured to support the bearing systems 38 in the turbine section 28. The inner shaft 40 and the outer shaft 50 are concentric and rotate via the bearing systems 38 about the engine central longitudinal axis A which is collinear with longitudinal axes of the shafts 40, 50.

The core airflow of the core flow path C is compressed by the low pressure compressor 44 and then high pressure compressor 52. The core airflow is then mixed and burned with fuel in the combustor 56. The combusted airflow is expanded over the high pressure turbine 54 and low pressure turbine 46. In some embodiments, a plurality of stator vanes 45 in the low pressure compressor 44 and a plurality of stator vanes 55 in the high pressure compressor 52 may be adjustable during operation of the gas turbine engine 20 to support various operating conditions. In other embodiments, the stator vanes 45, 55 may be held or arranged in fixed positions. The turbines 46, 54 are configured to rotationally drive the low speed spool 30 and the high speed spool 32, respectively, in response to the expansion of the core airflow downstream of the combustor 56. It will be appreciated that each of the positions of the fan section 22, compressor section 24, combustor section 26, turbine section 28, and the geared architecture 48 may be varied. For example, a gear system may be located aft of a combustor section or aft of a turbine section. Further, for example, a fan section may be positioned forward or aft of the location of an associated gear system.

The gas turbine engine 20 may be a high-bypass geared aircraft engine. In some embodiments, the gas turbine engine 20 may have a bypass ratio that is greater than about six (6), with an example embodiment being greater than about ten (10). In some embodiments, the geared architecture 48 may be an epicyclic gear train, such as a planetary gear system or other gear system, with a gear reduction ratio of greater than about 2.3 to one (2.3:1). In some embodiments, the low pressure turbine 46 may have a pressure ratio that is greater than about five (5). In one example non-limiting embodiment, the gas turbine engine 20 may have a bypass ratio that is greater than about ten to one (10:1). In some such embodiments, a diameter of the fan may be significantly larger than that of the low pressure compressor 44, and the low pressure turbine 46 may have a pressure ratio that is greater than about five to one (5:1). A pressure ratio of the low pressure turbine 46 is a pressure measured prior to an inlet of the low pressure turbine 46 as related to a pressure at the outlet of the low pressure turbine 46, and prior to an exhaust nozzle. It should be understood, however, that the above parameters are only exemplary of one embodiment of a geared architecture engine and that the present disclosure is applicable to other gas turbine engines including direct drive turbofans.

A significant amount of thrust may be provided by the bypass flow B due to a high bypass ratio. The fan section 22 of the gas turbine engine 20 may be designed for one or more particular flight conditions. For example, the fan section 22 may be designed for cruise at about 0.8 Mach and at about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is an industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

While the example gas turbine engine 20 of FIG. 1 illustrates a specific configuration of components, it will be understood that any number of spools, inclusion or omission of the geared architecture 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position system or mobile system, and other such applications.

Figure 2:
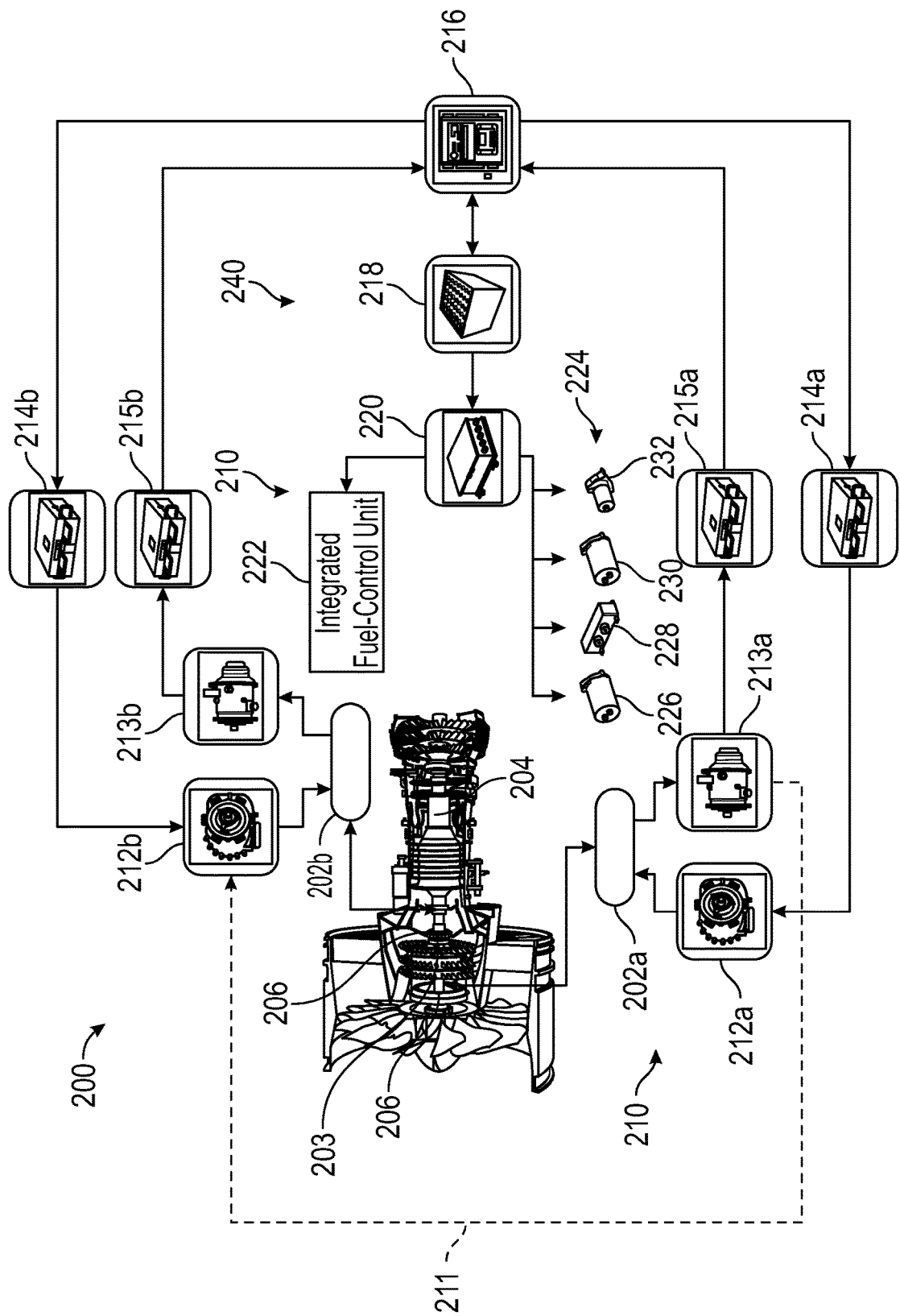
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 200 (also referred to as hybrid gas turbine engine 200) including an engine core 201 operably coupled to an electrical power system 210 as part of a hybrid electric aircraft. One or more mechanical power transmissions 202 (e.g., 202a, 202b) are operably coupled between the engine core 201 and the electrical power system 210. The engine core 201 may be part of a gas turbine engine similar to that shown and described with respect to FIG. 1. For example, the engine core 201 includes one or more spools, such as a low speed spool 203 and a high speed spool 204, each with at least one compressor section and at least one turbine section operably coupled to a shaft (e.g., a low pressure compressor and a low pressure turbine coupled to an inner shaft and a high pressure compressor and a high pressure turbine coupled to an outer shaft, such as depicted in FIG. 1). In some embodiments, the engine core may be configured to burn or combust hydrocarbon fuels (e.g., jet fuel). In other embodiments, the engine core may be configured to burn or combust hydrogen (e.g., from a liquid hydrogen supply and combusted in gaseous or liquid form). It will be appreciated that the engine core of the present disclosure may be any type of engine configured for propulsion of aircraft and the like.

The electrical power system 210, as shown, includes a first electric motor 212a configured to augment rotational power of the low speed spool 203 and a second electric motor 212b is configured to augment rotational power of the high speed spool 204. Although two electric motors 212a, 212b are depicted in FIG. 2, it will be understood that there may be only a single electric motor (e.g., only electric motor 212b for rotation of the high speed spool as discussed below) or additional electric motors (not depicted) may be included within systems in accordance with the present disclosure.

The electrical power system 210 includes a first electric generator 213a configured to convert rotational power of the low speed spool 203 to electric power and a second electric generator 213b configured to convert rotational power of the high speed spool 204 to electric power. Although two electric generators 213a, 213b are depicted in FIG. 2, it will be understood that there may be only a single electric generator (e.g., only electric generator 213a) or additional electric generators (not depicted) may be incorporated into systems in accordance with the present disclosure. In some embodiments, one or more of the electric motors 212a, 212b can be configured to operate either as a motor or a generator depending upon an operational mode or system configuration, and thus one or more of the electric generators 213a, 213b may be omitted.

In the example of FIG. 2, a first mechanical power transmission 202a includes a gearbox operably coupled between an inner shaft 205 and a combination of the first electric motor 212a and the first electric generator 213a. A second mechanical power transmission 202b can include a gearbox operably coupled between an outer shaft 206 and a combination of the second electric motor 212b and the second electric generator 213b. In some embodiments, where the electric motors 212a, 212b are configurable between a motor mode of operation and a generator mode of operation, the mechanical power transmission 202a, 202b can include a clutch or other interfacing element(s).

The electrical power system 210 can also include motor drive electronics 214a, 214b operable to condition current to the electric motors 212a, 212b (e.g., DC-to-AC converters). The electrical power system 210 can also include rectifier electronics 215a, 215b operable to condition current from the electric generators 213a, 213b (e.g., AC-to-DC converters). The motor drive electronics 214a, 214b and rectifier electronics 215a, 215b can interface with an energy storage management system 216 that may interface with an energy storage system 218. The energy storage management system 216 may be configured as a bi-directional DC-DC converter that regulates voltages between the energy storage system 218 and the electronics 214a, 214b, 215a, 215b. The energy storage system 218 can include one or more energy storage devices, such as batteries, super capacitors, ultra-capacitors, and the like. The energy storage management system 216 can facilitate various power transfers within the hybrid electric propulsion system 200. For example, power from the first electric generator 213a can be transferred to the second electric motor 212b as a power transfer from the low speed spool 203 to the high speed spool 204 (indicated as dashed line 211 in FIG. 2). Other examples of power transfers may include a power transfer from the second electric generator 213b to the first electric motor 212a as a power transfer from the high speed spool 204 to the low speed spool 203.

A power conditioning unit 220 and/or other components can be powered by the energy storage system 218. The power conditioning unit 220 can distribute electric power to support actuation and other functions of the engine core 201. For example, the power conditioning unit 220 can power an integrated fuel control unit 222 to control fuel flow to the engine core 201. The power conditioning unit 220 can also be configured to power a plurality of actuators 224. For example, such actuators 224 can include, without limitation, a low pressure compressor bleed valve actuator 226, a low pressure compressor vane actuator 228, a high pressure compressor vane actuator 230, an active clearance control actuator 232, and other such effectors. In some embodiments, the low pressure compressor vane actuator 228 and/or the high pressure compressor vane actuator 230 can be omitted where active control of stator vanes of the engine core 201 is not necessary. Collectively, any effectors that can change a state of the engine core 201 and/or the electrical power system 210 may be referred to as hybrid electric system control effectors 240. Examples of the hybrid electric system control effectors 240 can include the electric motors 212a, 212b, the electric generators 213a, 213b, the integrated fuel control unit 222, the actuators 224, and/or other elements of the hybrid electric propulsion system 200 (not depicted). In one non-limiting embodiment, an electrical boost provided to the high speed spool 204 and/or the low speed spool 203 can enable reduction or elimination of variable vane actuators of the high speed spool 204 and/or the low speed spool 203, as the need for variable vanes may be reduced or eliminated.

Figure 3:
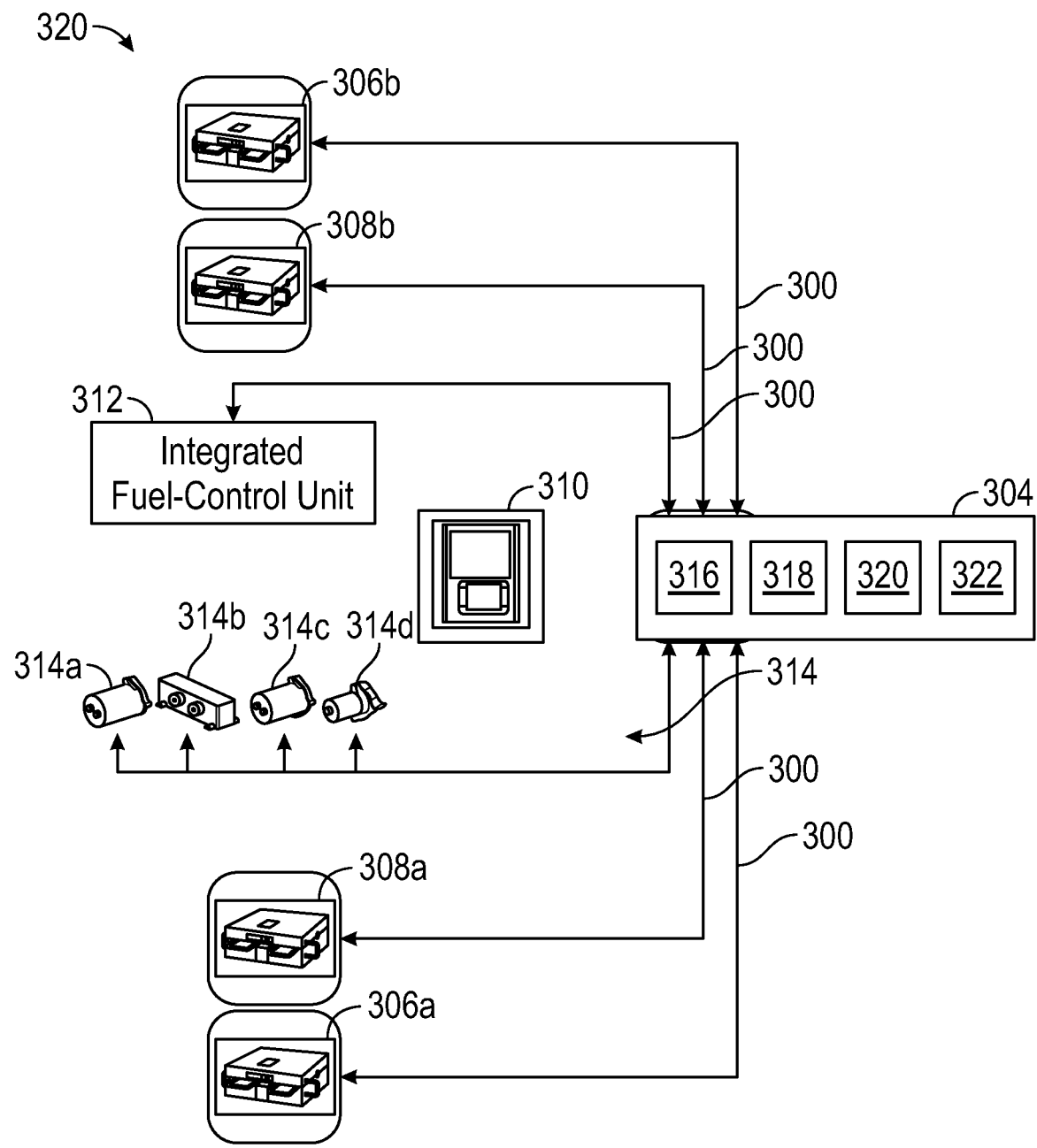
FIG. 3 is a schematic diagram of control signal paths of a hybrid electric propulsion system, in accordance with an embodiment of the disclosure.

FIG. 3 is a schematic diagram of control signal paths 300 of a hybrid electric propulsion system 302 in accordance with an embodiment of the present disclosure. The hybrid electric propulsion system 302 is schematically shown and may be configured similar to that shown and described above. A controller 304 is configured to interface with motor drive electronics 306a, 306b, rectifier electronics 308a, 308b, an energy storage management system 310, an integrated fuel control unit 312, a plurality of actuators 314, and/or other components (not depicted) of a hybrid electric propulsion system. The actuators 314, in this embodiment, may include, for example and without limitation, a low pressure compressor bleed valve actuator 314a, a low pressure compressor vane actuator 314b, a high pressure compressor vane actuator 314c, and an active clearance control actuator 314d. In some embodiments, the controller 304 can control and monitor for fault conditions of the engine core and/or the electrical power system of the hybrid electric propulsion system 302. For example, the controller 304 can be integrally formed or otherwise in communication with a full authority digital engine control (FADEC) of the engine core. In the illustrative embodiment, the controller 304 includes a processing system 316, a memory system 318, and an input/output interface 320. The controller 304 can also include various operational controls, such as a power transfer control 322 that is configured to control one or more hybrid electric system control effectors as further described herein.

The processing system 316 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 318 can store data and instructions that are executed by the processing system 316. In some embodiments, the memory system 318 may include random access memory (RAM), read only memory (ROM), or other electronic, optical, magnetic, or any other computer readable medium onto which is stored data and algorithms in a non-transitory form. The input/output interface 320 is configured to collect sensor data from the one or more system sensors and interface with various components and subsystems, such as components of the motor drive electronics 306a, 306b, the rectifier electronics 308a, 308b, the energy storage management system 310, the integrated fuel control unit 312, the actuators 314, and/or other components (not depicted) of the hybrid electric propulsion system 302. In some embodiments, the controller 304 is configured to provide a means for controlling one or more hybrid electric system control effectors based on the power transfer control 322 that is dynamically updated during operation of the hybrid electric propulsion system 302. In some embodiments, the means for controlling the hybrid electric system control effectors can be otherwise subdivided, distributed, or combined with other control elements.

The power transfer control 322 may be configured to apply control laws and access/update models to determine how to control and transfer power to and from the hybrid electric system control effectors. For example, sensed and/or derived parameters related to speed, flow rate, pressure ratios, temperature, thrust, and the like can be used to establish operational schedules and transition limits to maintain efficient operation of an engine core (e.g., gas turbine engine) of the hybrid electric propulsion system 302. The controller 304 may be configured to monitor electrical/motor data and/or engine data from the engine core in order to make determinations regarding health and/or faults of the engine core.

Figure 4:
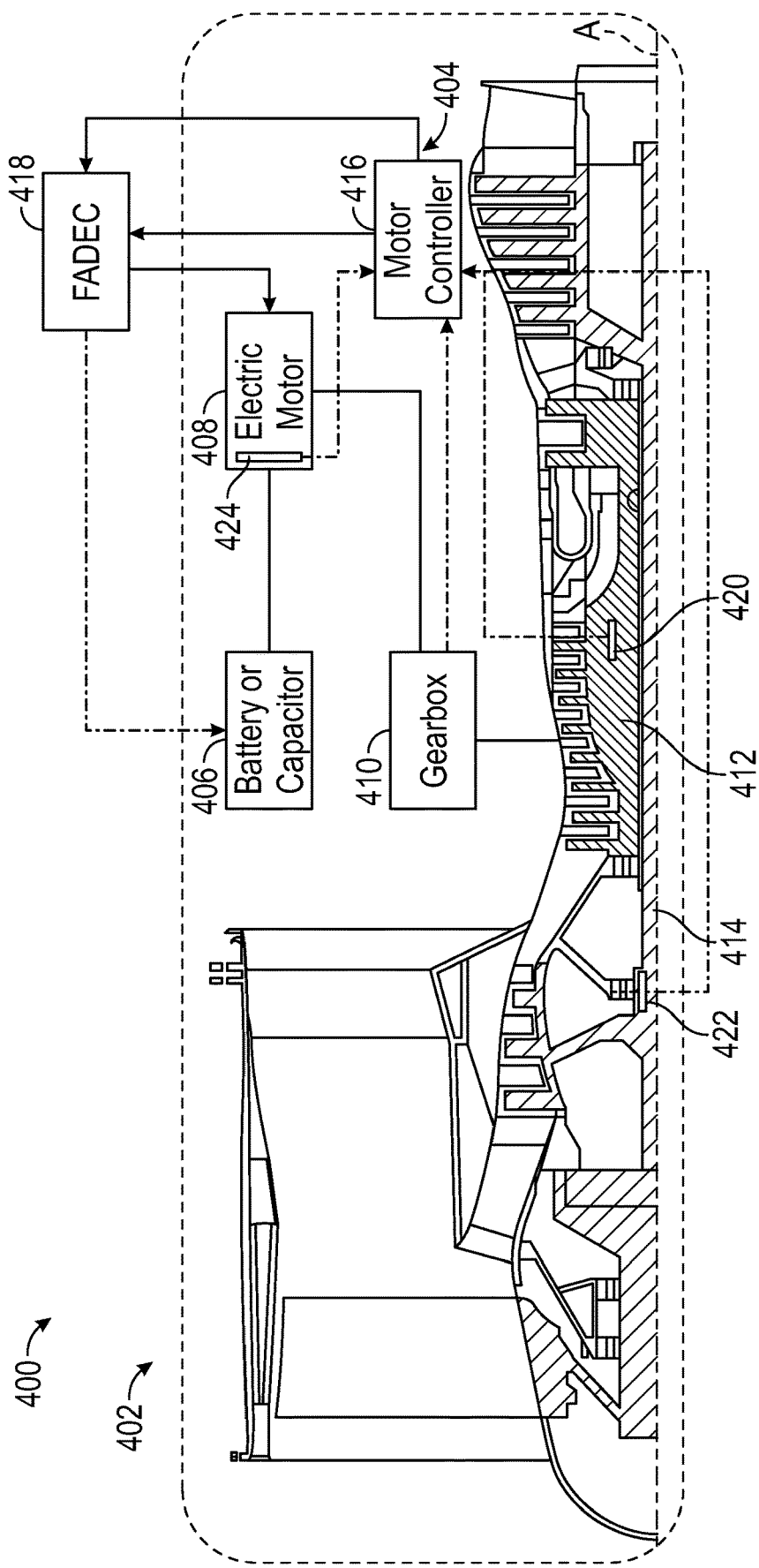
FIG. 4 is a partial cross-sectional illustration of a hybrid gas turbine engine in accordance with an embodiment of the disclosure.

Referring now to FIG. 4, a hybrid electric propulsion system 400 (also referred to as hybrid turbine engine 400) including an engine core 402 operably coupled to an electrical power system 404 as part of a hybrid electric aircraft in accordance with a non-limiting embodiment of the present disclosure is illustrated. The hybrid electric propulsion system 400 includes a power source 406 such as a battery, a super capacitor, an ultra-capacitor, or an equivalent thereof, which is configured to supply power to an electric motor 408. The electric motor 408, in this embodiment, is connected to an engine accessory gearbox 410 that may be operably coupled to one or both of a high speed spool 412 and a low speed spool 414 of the engine core 402. The electric motor 408 may be controlled by a motor controller 416 to add power to one or both of the high speed spool 412 and the low speed spool 414 and/or extract power from one or both of the high speed spool 412 and the low speed spool 414. A full authority digital engine control (FADEC) 418 may be configured to control operation of the engine core 402 and/or the electrical power system 404.

The motor controller 416 and/or the FADEC 418 may be configured to receive information or data from one or more sensors associated with the engine core 402 and/or the electrical power system 404. Although illustratively shown as a FADEC 418 and motor controller 416, other controllers and/or control systems may be employed without departing from the scope of the present disclosure. For explanatory purposes, the motor controller 416 is configured to receive data or information from a high speed spool sensor 418 and a low speed spool sensor 420. The high speed spool sensor 418 and the low speed spool sensor 420 are each configured to monitor one or more characteristics, properties, or aspects of the associated spools 412, 414. For example, the high speed spool sensor 418 and the low speed spool sensor 420 may each be configured to monitor, at least, a rotational speed and/or vibrations of the associated spools 412, 414.

The motor controller 416 is also configured to receive data from one or more components of the electrical power system 404 (e.g., from the electric motor 408 and/or the gearbox 410). The data from the components of the electrical power system 404 may be received from one or more sensors associated with the components or from related onboard computer components, such as controllers, logic systems, and the like. For example, as shown in FIG. 4, the electric motor 408 may include one or more electrical sensors 424, and such as a current sensor and/or a voltage sensor. In some embodiments, the motor controller 416 may be configured in communication with the FADEC 418. In some embodiments of the present disclosure, the motor controller 416 may be configured to monitor electrical signals (e.g., voltages) and/or electrical feedback to monitor for faults within the electrical power system 404 and/or related to operation of the engine core 402. If a fault is detected at the motor controller 416, in such configurations, the motor controller 416 may be configured to send a signal or notification to the FADEC 418 and/or a display in a cockpit for an operator to see, hear, or otherwise be notified of a potential fault or the like.

In accordance with some embodiments of the present disclosure, the motor controller may be employed to indirectly monitor engine conditions of the engine core based on voltage (e.g., back EMF) and/or current when the electric motor is in use or not in use. Detection of fault conditions, such as metering valve runaway, shaft failure, rub events, debris in core airfoil, bird strike, fan blade out, etc. may be achieved through monitoring of electrical signals. It will be appreciated that engine cores may include sensors and other mechanisms for monitoring for such events, and thus, in some embodiments, the described systems may provide supplemental monitoring to such direct monitoring. That is, in some embodiments, the monitoring systems described herein, based on an electric machine may supplement the conventional gas turbine engine sensor systems, to thus improve reliability and effectiveness of such monitoring. Such monitoring using the electric motor controller can enable feedback monitoring, and for example, can replace or supplement high or low speed engine sensor(s). In some embodiments, such electric monitoring may functionally replace direct spool speed sensors.

In accordance with embodiments of the present disclosure, sensors of an electric motor are employed to monitor primary indicators and secondary indicators associated with engine core status/operation. The electric motor may be used, in this capacity, as a monitor for maintenance events of the engine, such as shaft failure, blade failure, rubbing events, valve runaway, etc. As used here, "primary indicators" may be monitored through speed detection and/or comparison related to rotational speeds of the spools of the engine core in combination with data associated with the electrical power system (e.g., electric machine). For example, primary indicators can include indication of a failure of a shaft (e.g., high speed spool or low speed spool). Such failure detection may be achieved through monitoring changes in an N1 or an N2 signal. N1 represents the low-pressure spool speed (in rpm) and N2 represents the high-pressure spool speed (in rpm). The primary indicators are associated with changes in primary N1/N2 signals. Primary indicators are associated with engine sensors designed to monitor engine parameters, including, but not limited to shaft rotational speeds, torque on shaft, etc.

In accordance with embodiments of the present disclosure, a logic process is implemented based on an acceptable tolerance or other predetermined tolerance or threshold. If, during operation, the detected speeds (or other parameter) diverge by more than the predetermined tolerance or threshold, the shaft would be declared failed. The preset tolerance or threshold may be based, at least in part, upon the accuracy of the sensors set to monitor the specific parameter. For example, the logic process may be based on a tolerance that is greater than the sum of the accuracy of the various sensors. This ensures that failures of the shaft are not falsely declared. In some non-limiting examples, shaft speed is a common and reliable signal that is available to detect shaft failure. Is this case, it is a speed signal and a significant change in the speed signal that indicates that there is an issue. For example, in some non-limiting embodiments, the change in the speed signal may be on the order of exceeding 2% of maximum speed. It will be appreciated that the specific value/threshold may be adjusted based on the specific engine configuration and/or operational state. However, the selection of the threshold may be selected to be large enough to be greater than natural errors/variations within a signal while being less than an upper limit that cannot be missed by the logic processes. Other examples of primary signals can include, without limitation, torque and/or shaft power, which may be used to determine a shaft failure, depending on the sensors present on the subject engine.

As used herein, "secondary indicators" may be detected though changes in electrical frequency signals and/or back EMF of the electrical power system. As noted, the primary indicators are indicators based on sensors that monitor the engine core directly. In contrast, secondary indicators are related to use of an electric machine that is coupled to the engine core. The secondary indicators are used to monitor for potential failures to the primary indicators. Such secondary indicators may thus indirectly indicate a fault within the engine core. For example, secondary indicators may be detected through a carrier wave that is observed on top of N1, N2 trend lines. In accordance with some embodiments and configurations, the secondary indicators may be based on changes over time, or instantaneous changes relative to a preset threshold or tolerance. By monitoring voltage, frequency, speed, current, Back EMF, etc. at the electric machine (e.g., using motor-based sensors), certain information may be obtained to monitor operation of the engine core. For example, by monitoring rotational speed at the motor (electric motor shaft), an overspeed or other event of the high speed or low speed spools may be detectable. Further, by monitoring signals over time, small variations (e.g., new or unique peaks in a signal) may be indicative of an issue forming within the engine. When such secondary indicators are detected, a response from the electric motor controller and/or FADEC may be used to enforce reduced operating envelopes to ensure a failure does not occur or to ensure flight may be maintained until maintenance may be performed. Further, a notification may be generated to indicate that a manual inspection is recommended or required, or other information may be displayed to an operator or pilot.

In one non-limiting example of a secondary indicator, a current sensor may be employed, in accordance with a process logic of the present disclosure, to detect a mechanical problem. In such an example, the current sensor may be provided to monitor power flow in a motor. Such current sensing may have small variations in the signal that are related to vibration in the gear train. An allowable tolerance or threshold vibration level may be preset to be monitored for. As such, if the amplitude of the current signal related to the vibration increases beyond the tolerance, such exceeded tolerance or threshold may indicate a problem is occurring within the gear train.

In accordance with some embodiments of the present disclosure, additional and/or supplemental sensing and/or monitoring capabilities regarding engine health are provided. Such systems and capabilities are provided through the use of sensors and monitoring operation of an electric motor that operates in parallel with the engine core. The motor sensing may provide a secondary check on rotational speeds of the engine (primary indicators) or may be used to monitor more subtle and less readily detectable events (secondary indicators).

Figure 5A:
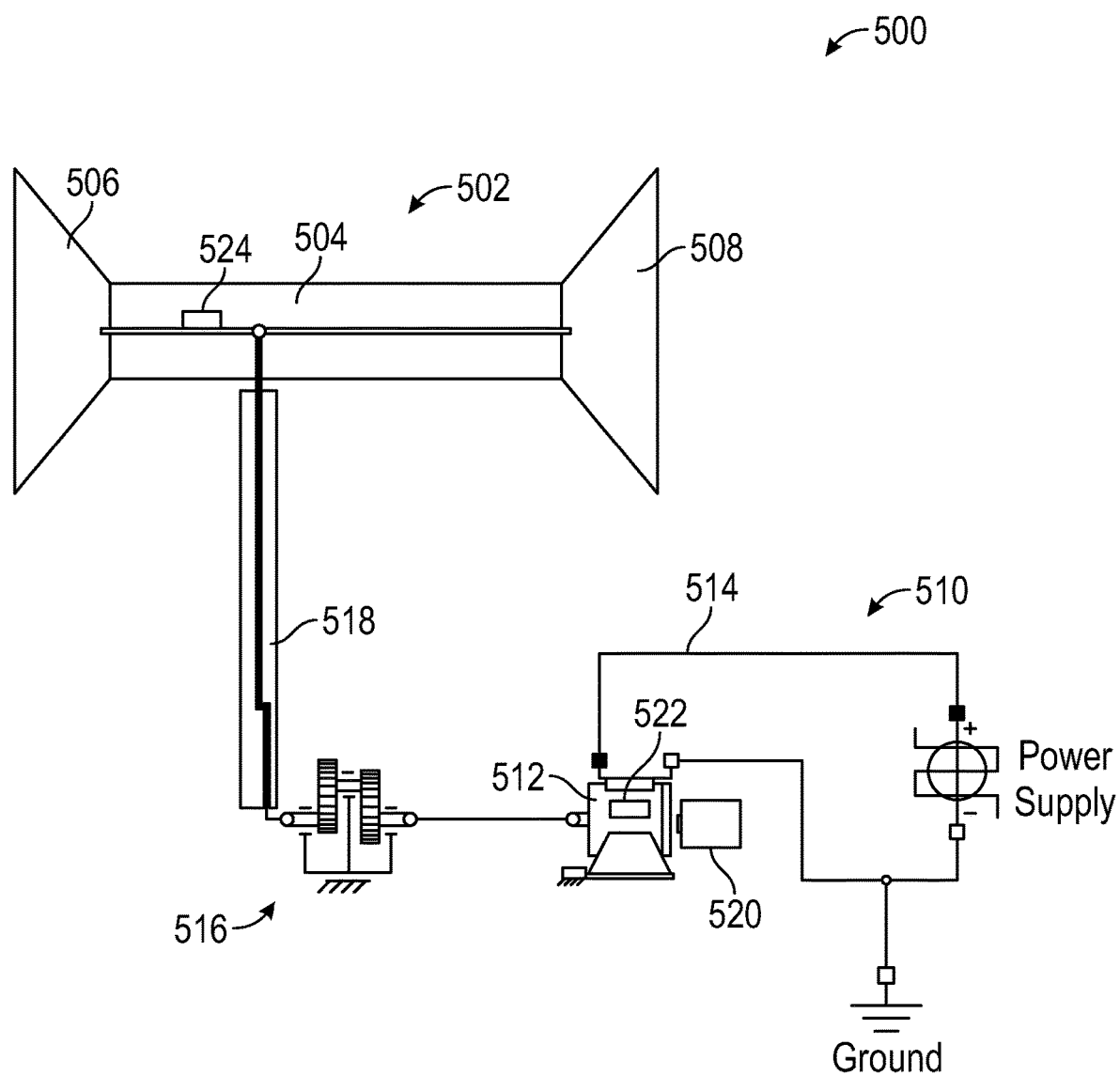
FIG. 5A is a schematic diagram of an engine fault electric machine detection system in accordance with an embodiment of the present disclosure.

Turning now to FIGS. 5A-5C, a description of an engine fault electric machine detection system 500 in accordance with an embodiment of the present disclosure is provided. The engine fault electric machine detection system 500, in this example, is described for monitoring a shaft of a hybrid electric turbine engine. The engine fault electric machine detection system 500 is configured to monitor one or more speed sensors to determine if a failure of a shaft (e.g., spool) has occurred.

The engine fault electric machine detection system 500, as shown in FIG. 5A, includes an engine core 502 having a high speed shaft 504 that is operably coupled to a high speed compressor 506 and a high speed turbine 508. The engine fault electric machine detection system 500 also includes an electrical power system 510. The electrical power system 510 includes an electric machine 512 and an electric circuit 514. The electric machine 512 is mechanically coupled to the high speed shaft 504 through a gear system 516 and a tower shaft 518. The gear system 516 may be configured to enable power transfer from the electric machine 512 to the high speed shaft 504 or from the high speed shaft 504 to the electric machine 512. A motor controller 520 is operably coupled to the electric machine 512 and configured to control operation thereof. The engine fault electric machine detection system 500 includes a motor speed sensor 522 and a shaft speed sensor 524. The sensors 522, 524 may be arranged in communication with the motor controller 520, a FADEC, or other controller device or system, as will be appreciated by those of skill in the art. In the configuration of the engine fault electric machine detection system 500, the electric machine 512 is connected to the high pressure compressor 506 through the tower shaft 518 and the gear system 516.

FIG. 5B illustrates a plot 526 that illustrates a motor speed (rad/sec) 528 and a shaft speed (rad/sec) 530, as a function of time, during normal operation. As shown, during normal operation, the rotational speed of the electric machine 512 (motor speed 528) and the rotational speed of the high speed shaft 504 (shaft speed 530) are aligned. The electric machine 512 has constant voltage and the engine core 502 has constant torque, resulting in a constant speed. FIG. 5C illustrates a plot 532 that illustrates a shaft failure. Specifically, as shown in plot 532, the motor speed 528 and the shaft speed 530 deviate at the point of failure 534. In this example, the point of failure 534 occurs at a time 5 s. From the point of failure 534 forward, the two plots deviate with the motor speed 538 reflecting a higher rotational speed than the shaft speed 530. The point of failure 534 may be reflective of a loss of load on the high speed shaft 504. When these rotational speeds decouple, it is indicative of a shaft failure, and corrective action may be taken.

In the embodiment of FIGS. 5A-5C, the engine fault electric machine detection system 500 is configured to monitor a primary indicator of the engine core 502. Specifically, a direct comparison of an aspect of the engine core 502 is made against an aspect of the electrical power system 510. In this specific case, the rotational speed of an engine shaft is compared against a rotational speed of the electric machine. Similar primary indicators may be used for a low speed spool, for example. In accordance with some embodiments of the present disclosure, speed of the shaft(s) is a primary indicator, but speed of the motor may also be also considered a primary indicator. A mismatch of two signals may be used for their primary purpose (speed). In accordance with other embodiments, torque of the motor may be a secondary indicator, as it is calculated in the motor controller. A sudden change in measured torque of the motor may indicate that a failure took place. For example, such sudden change in a measured torque, such as dropping from a current level to within 1% of zero ft-lbf while the engine continues to operate at a current speed, may indicate that a shaft has failed on the engine.

Turning now to FIGS. 6A-6E, a description of an engine fault electric machine detection system 600 in accordance with an embodiment of the present disclosure is provided. The engine fault electric machine detection system 600, in this example, is described for monitoring a gearbox of a hybrid electric turbine engine. The engine fault electric machine detection system 600 is configured to monitor a motor current to detect faults of a gearbox or gears of the hybrid electric turbine engine.

Figure 6A:
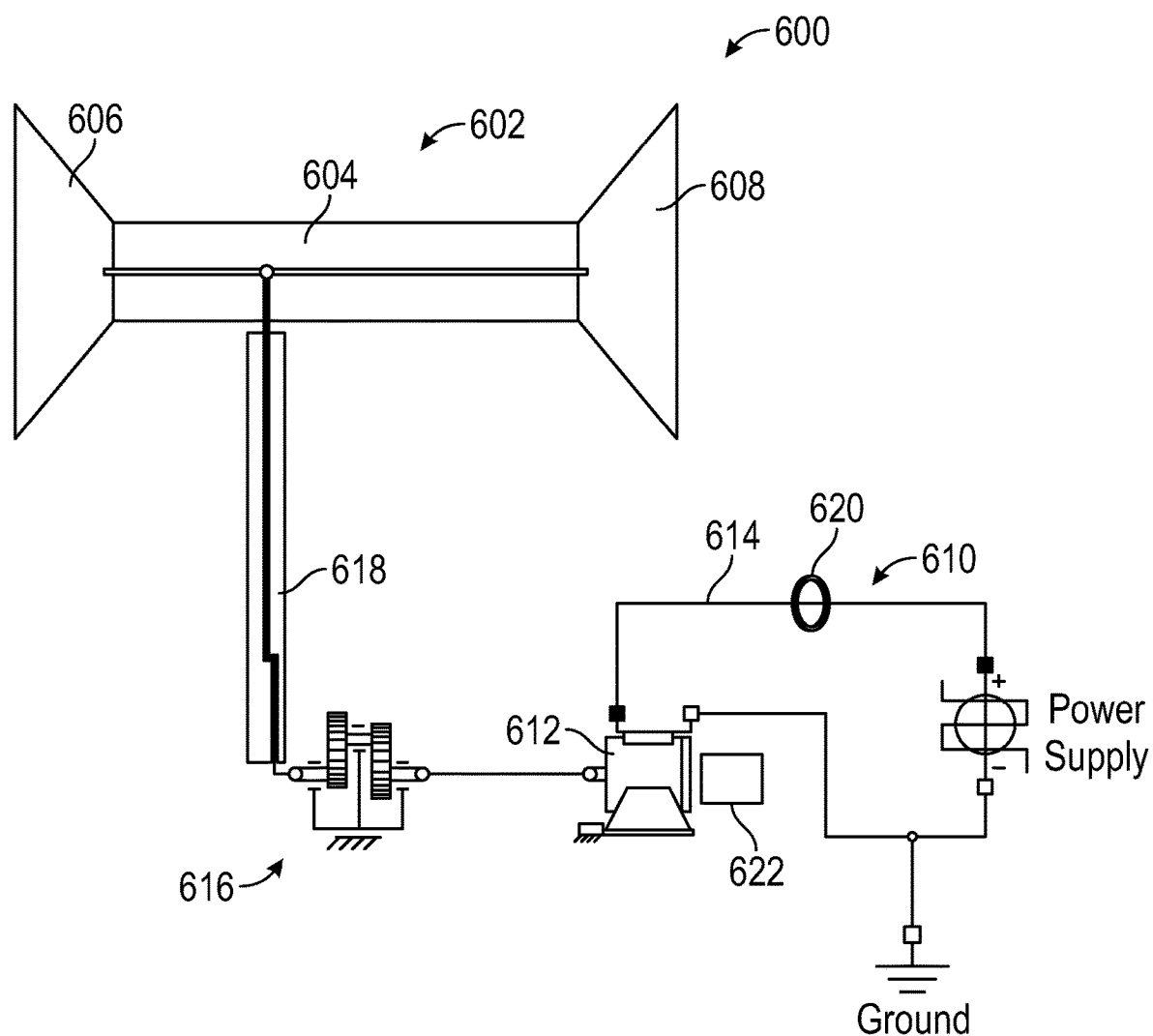
FIG. 6A is a schematic diagram of an engine fault electric machine detection system in accordance with an embodiment of the present disclosure.
Figure 6B:
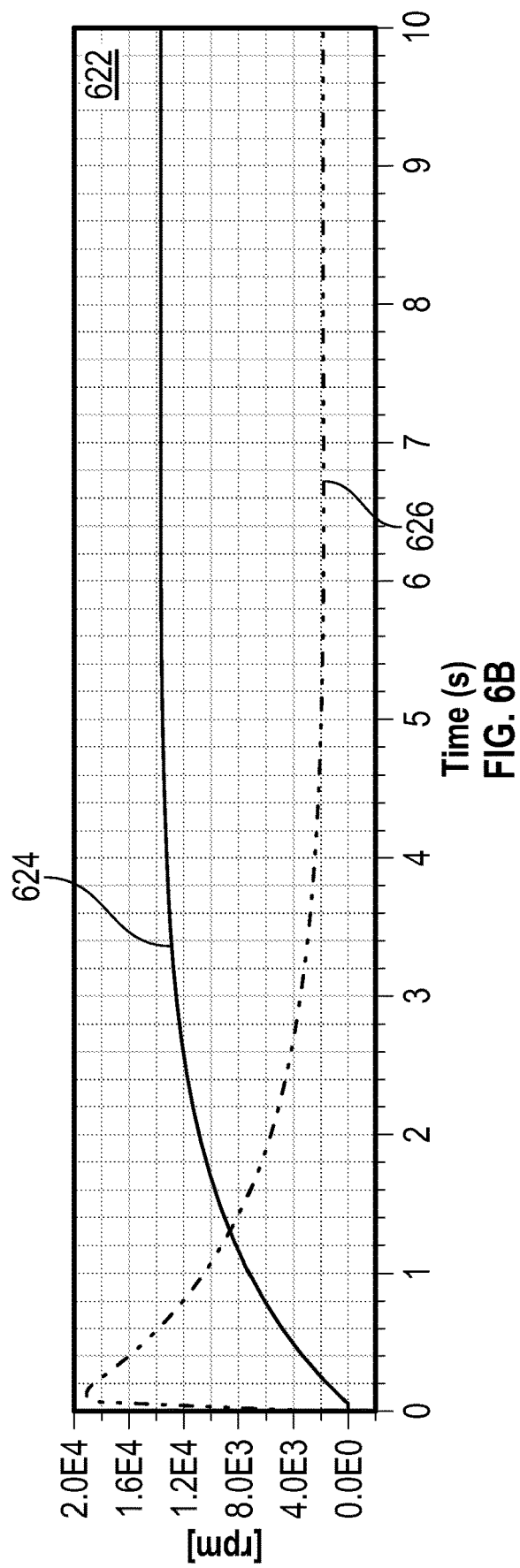
FIG. 6B is a plot of shaft speed and electrical current as a function of time during normal operation of the system of FIG. 6A.

The engine fault electric machine detection system 600, as shown in FIG. 6A, includes an engine core 602 having a high speed shaft 604 that is operably coupled to a high speed compressor 606 and a high speed turbine 608. The engine fault electric machine detection system 600 also includes an electrical power system 610. The electrical power system 610 includes an electric machine 612 and an electric circuit 614. The electric machine 612 is mechanically coupled to the high speed shaft 604 through a gear system 616 and a tower shaft 618. The gear system 616 may be configured to enable power transfer from the electric machine 612 to the high speed shaft 604 or from the high speed shaft 604 to the electric machine 612. In this monitoring configuration, an electric sensor 620 is arranged along the electric circuit 610. In some embodiments, the electric sensor 620 may be integrated into the electric machine 612.

In the configuration of the engine fault electric machine detection system 600, the electric machine 612 is connected to the high pressure compressor 606 through the tower shaft 618 and the gear system 616. A motor controller 622 is operably coupled to the electric machine 612 and/or the electric circuit 614 and is configured with capabilities for monitoring current and/or voltage, for example, using the electric sensor 620. The electric sensor 620 may include one or more sensor elements arranged to monitor various electrical properties of the engine fault electric machine detection system 600.

Figure 6C:
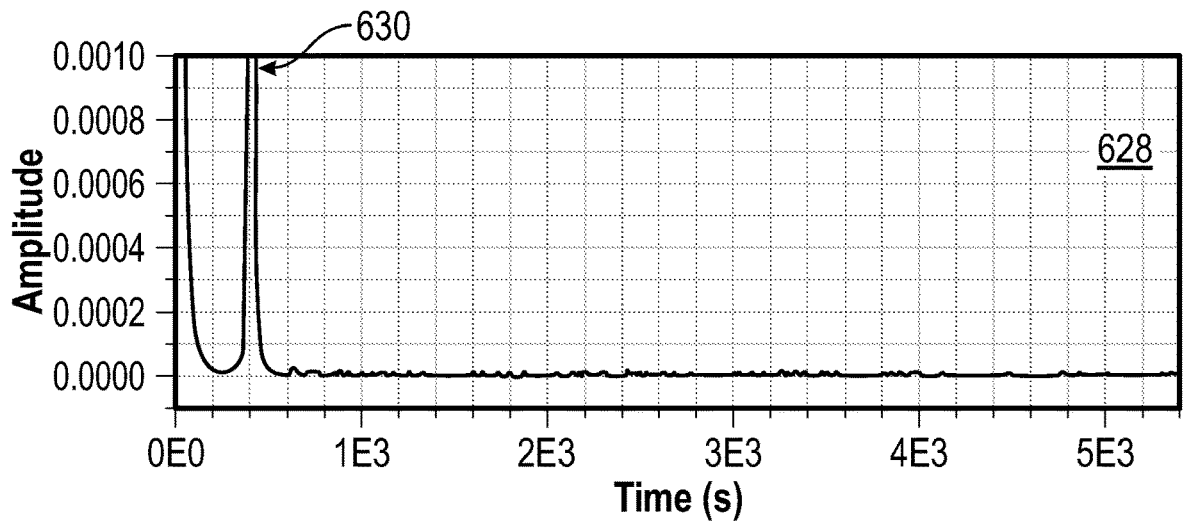
FIG. 6C is a frequency plot of an electric current of the system of FIG. 6A during normal operation.
Figure 6D:
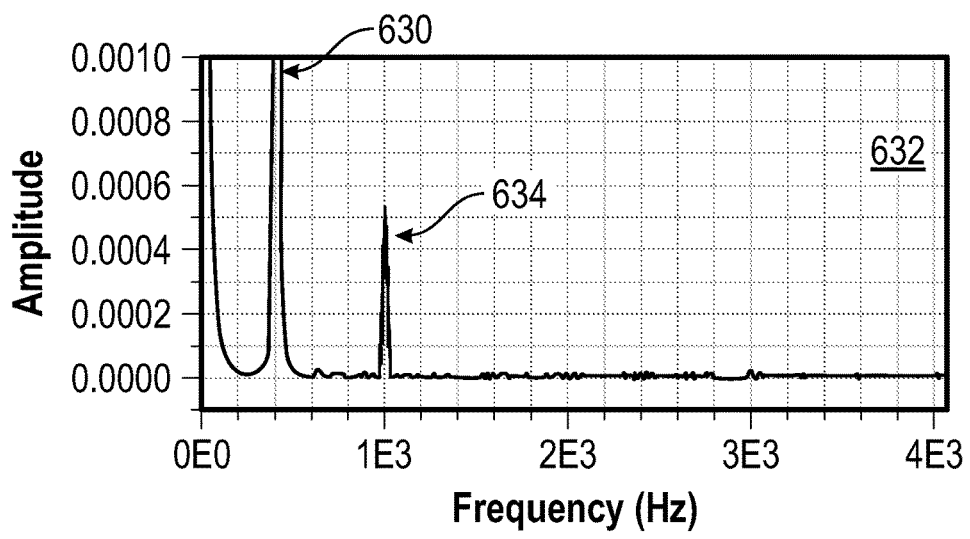
FIG. 6D is a frequency plot of an electric current of the system of FIG. 6A during an operation with a deteriorating gear system.
Figure 6E:
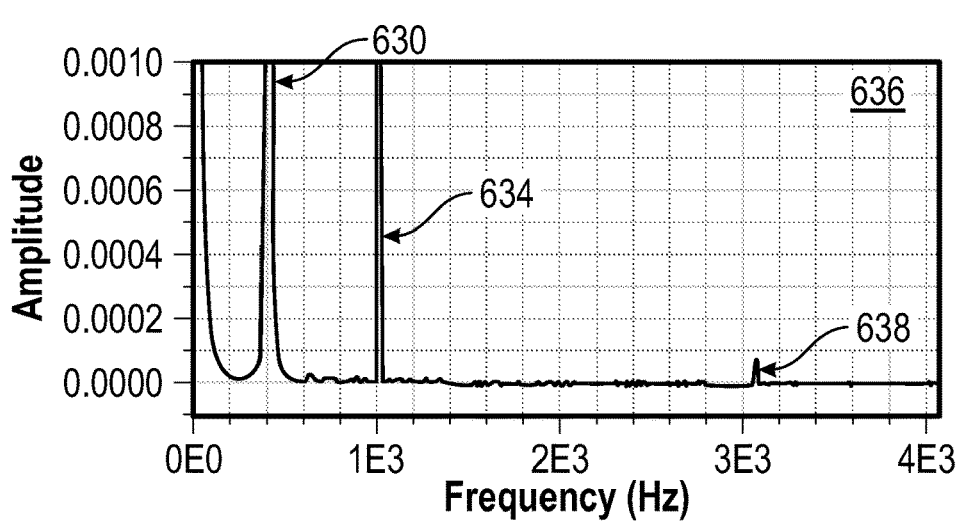
FIG. 6E is a frequency plot of an electric current of the system of FIG. 6A during an operation with a failed gear system.

In operation, the electric machine 612 may be operated using a constant voltage and the high speed shaft 604 may be run with constant torque. This results in a constant speed. This is illustrated in plot 622 of FIG. 6B. In plot 622, a shaft speed 624 and an electrical current 626 are plotted as a function of time. FIGS. 6C-6E illustrate plots of current measurements during operation of the engine fault electric machine detection system 600. Plot 628 of FIG. 6C illustrates a normal operation of the engine core 602 and the current of the electric machine 612 during such operation. As illustrated in plot 628, a dominant peak 630 is observed which corresponds with a natural frequency of the high speed shaft 604. Plot 632 of FIG. 6D illustrates a frequency plot of current in a situation where the gear system 616 may be subject to degradation but not failure. As shown in plot 632, the dominant peak 630 of the natural frequency of the high speed shaft 604 is still present, but there is also a secondary peak 634 at a higher frequency and is indicative of a degrading gear system 616. This secondary peak 634 is the result of increased force required at each rotation. Plot 636 of FIG. 6E is illustrative of a failure of the gear system 616. As shown, the secondary peak 634 has increased in amplitude and a tertiary peak 638 is observed. The tertiary peak 638 is of a higher frequency than the secondary peak 634.

By monitoring the additional peaks that appear at higher frequencies greater than the natural operational frequencies, and monitoring the amplitudes of such additional peaks, the health state of the gear system 616 may be determined. In the embodiment of FIGS. 6A-6E, the engine fault electric machine detection system 600 is configured to monitor a secondary indicator of the engine core 602. Specifically, by monitoring an aspect of the electric machine 612 (e.g., voltage, frequency, speed, current, Back EMF, etc.) a conclusion regarding the health of the engine core 602 may be provided. It will be appreciated that a fault may be declared when an energy level of any peak rises above a threshold value. For example, the peak related to a rotating gear is always present, however, it is only a problem if an amplitude increases above the threshold value.

In the configuration illustrated in FIGS. 6A-6E, motor data that is monitored comprises electrical current data. The electrical current data is associated with an engine condition, such as health of a gear system that connects the electric machine to at least one shaft. In operation, the natural frequency of operation (dominant peak 630) is monitored and a fault is detected when a secondary peak frequency is detected that is different from the natural frequency (e.g., peaks 634, 638). As illustrated, different types of faults may be detected, based on the nature of the secondary/tertiary peaks. For example, when the secondary peak frequency (634) is below a predetermined threshold amplitude, a first fault state may be detected and if the secondary peak frequency (634) is above the threshold amplitude, a second fault state may be detected. In this illustrative embodiment, the secondary peak frequency is indicative of a gear system health or failure, and the separation between a deteriorating gear system versus a failed gear system may be based on the threshold amplitude. Further, in some embodiments, in combination with a threshold amplitude or alternatively thereto, the tertiary frequency peak (638) may be the determination between a poor health gear system as compared to a failure in the gear system.

As an example of use of an embodiment of the present disclosure, sensors and sensor drift may be addressed. For example, when a sensor ages, the sensor can start to drift and provide less accurate measurements. There is typically a tolerance or range (e.g., +/−%) depending on the senor, but at a certain point if the drift becomes too large, it can cause hazardous failure conditions for the engine. Accordingly, by observing secondary indicators (e.g., variation or mismatch with the electric machine frequency and back EMF measurements), a backup may be provided regarding indication that an engine speed sensor has drifted past an acceptable limit.

Figure 7A:
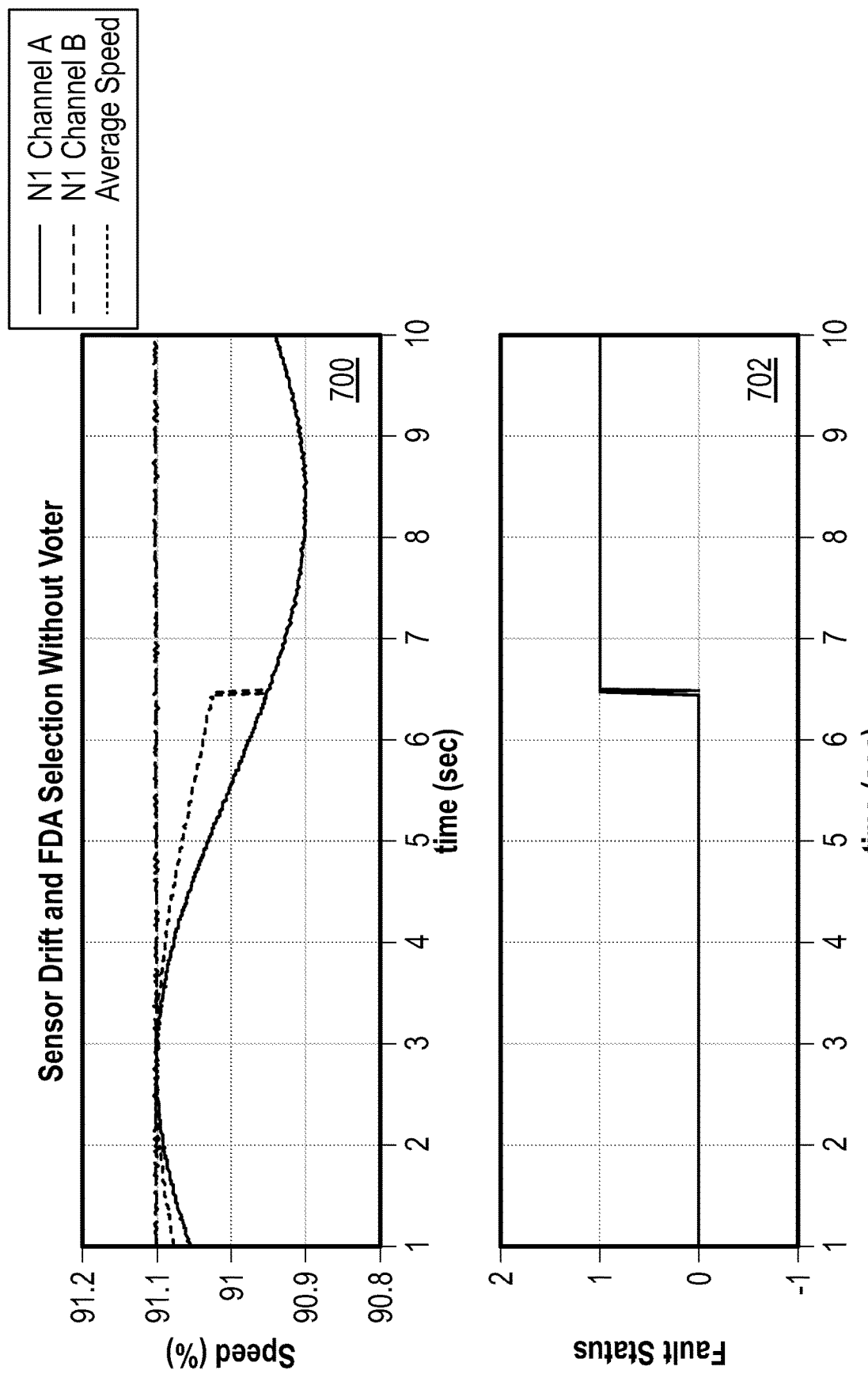
FIG. 7A includes plots representative of detection of sensor drift and fault detection and accommodation ("FDA") selection without a voter.
Figure 7B:
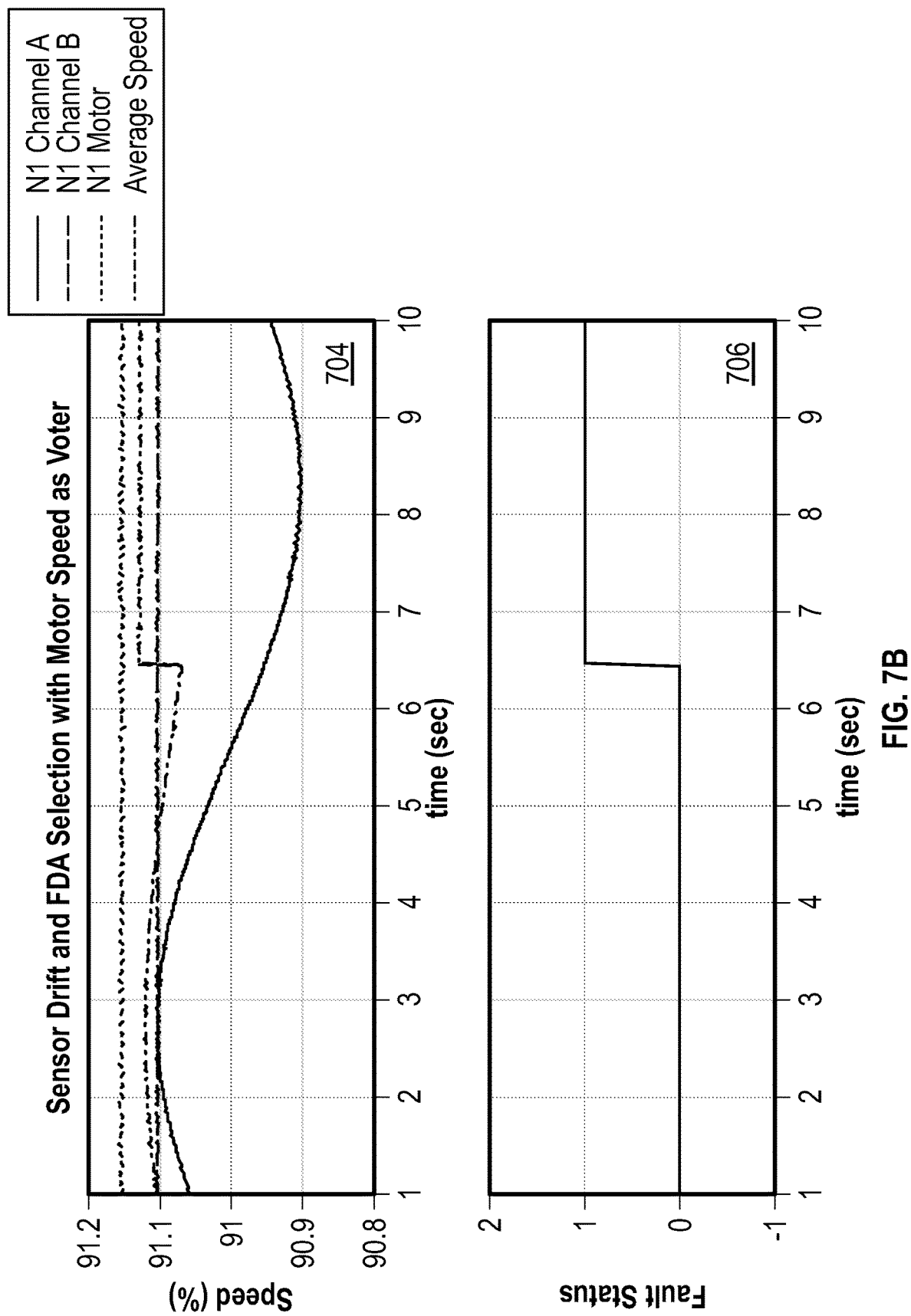
FIG. 7B includes plots representative of detection of sensor drift and FDA selection with a voter.

Turning now to FIGS. 7A-7B, schematic plots of sensor signals related to detection of sensor drift are illustratively shown. The plots of FIG. 7A represent detection of sensor drift and fault detection and accommodation ("FDA") selection without a voter and the plots of FIG. 7B represent detection of sensor drift and FDA selection with a voter. In the process related to FIG. 7A, three signals are used, whereas in the process related to FIG. 7B, four signals are used, which enables the voting aspect of this example embodiment.

FIG. 7A includes a plot 700 of speed percent as a function of time and a fault detection plot 702. In plot 700, a plot of the speed percent of two channels A, B of the N1 (high speed spool) and an average speed are illustrative shown. In plot 700 N1 Channel A represents a sensor signal of a first high speed spool speed sensor and N1 Channel B represents a sensor signal of a second high speed spool speed sensor. At about time 6.5 seconds in plot 700, 702, a fault is detected (e.g., fault status goes from "0" to "1" indicating a fault is detected). In detection of a fault using three signals, as shown in Plot 700, when the signal drifts by more than a preset drift or error threshold (e.g., 0.15% in the average speed in this Examiner), a fault is declared. However, from the information at hand in plot 700 (three sensor configuration), it is unknown which is the good signal and which signal is drifting. Because this is unknown, a model is typically employed to determine (or guess) the appropriate/accurate value/sensor, or a selection is made based on the "safer" of the two values. In this case, "safe" means the result of using the signal could not move the engine to a dangerous operating condition such as an overspeed operation.

In FIG. 7B, plot 704 includes, in addition to two channel N1 (A, B) and an average speed similar to plot 700, a motor speed that is used in the algorithm for determining sensor drift and errors and selecting which sensor is the faulty sensor and which is the non-fault sensor. A three signal average may be used to create an average value which is the signal a control would use to base its decisions on, in accordance with an embodiment of the present disclosure. When the difference between the engine speed sensors exceeded 0.15%, in this example, one value is dropped from the average. In this example, because the motor speed is closer to Channel B, Channel A is discarded and the system transitions to a two signal average. For example, as shown in plot 706, a fault occurs at time 6.5 seconds. In plot 704, N1 Channel A has a sinusoidal plot curve, whereas N1 Channel B has a steady-state. However, as shown, the addition of the N1 motor signal also shows a steady state, and thus the sensor associated with Channel B is identified as the proper functioning sensor, and the sensor associated with Channel A is identified as the sensor having a fault or error. It is noted that in FIG. 7B, the specific curve shape (sinusoidal and/or steady state) is merely representative and used for explanatory purposes to illustrate the deviation between the signals. In practice, the signals may be significantly different, but the principle of a deviation of a signal relative to a tolerance is employed to determine a fault or failure.

In each of the examples discussed in FIGS. 5A-5C and 6A-6E and FIGS. 7A-7B, specific monitoring systems/configurations and plots are described in accordance with examples of the present disclosure. In each case, an electric machine is coupled to a high speed spool or shaft. However, such configurations are not to be limiting. For example, similar configurations of electric machines coupled to low speed spools/shafts are also contemplated herein. Further, for example, a single electric machine may be coupled to both a high speed shaft and a low speed shaft, and monitoring of features of both shafts may be achieved similar to the configurations described above. In each case, the electrical power system of the hybrid electric turbine engine is used to monitor for health and wear on the engine core components (including the gear system connecting the two). In some embodiments of the present disclosure, and without limitation, a fan speed sensor may be used in a geared turbo fan engine configuration to determine faults in such an engine.

In general, the fault detection and accommodation and event detection processes and systems described herein are directed to a series of out of range, high or low rate, or tolerance detection algorithms. In each case, typically engine sensors would be used to detect faults or events, and these sensors are configured detect when an associated value exceeds expectation (e.g., preset values, thresholds, etc.). A secondary measurement from the motor or electrical power systems enables redundancy, confirmation, and/or precision in determining a failure of a component and/or engine sensor.

For example, when using a metering (or other) valve, a sensor is configured to detect if a valve has moved at a rate that is not physically possible, and therefore is indicative of a fault. Or, for example, a sensor may detect a reading or value that is too high and such value may not be physically possible, and thus indicative of a fault or failure. Or, for example, a sensor may detect that a tolerance of where a sensor reading is expected to be has been exceeded versus where it is currently reporting (e.g., engine is running but the valve sensor claims to be closed is an extreme example). The above described operations are all variations encompassed by the present disclosure. It will be appreciated that other variations thereon, where a motor system is used to confirm or detect faults of an engine core or components (e.g., sensors) associated therewith. The processes described herein may be used, for example and without limitation, to determine runaway events, rub events, debris in core airfoil events, bird strike events, fan blade out events, and the like.

The main difference we have been talking about here is the idea that the sensors exist across systems and that these sensors do not exist today because we have not had a motor and motor control attached to the engine in this way.

Figure 8:
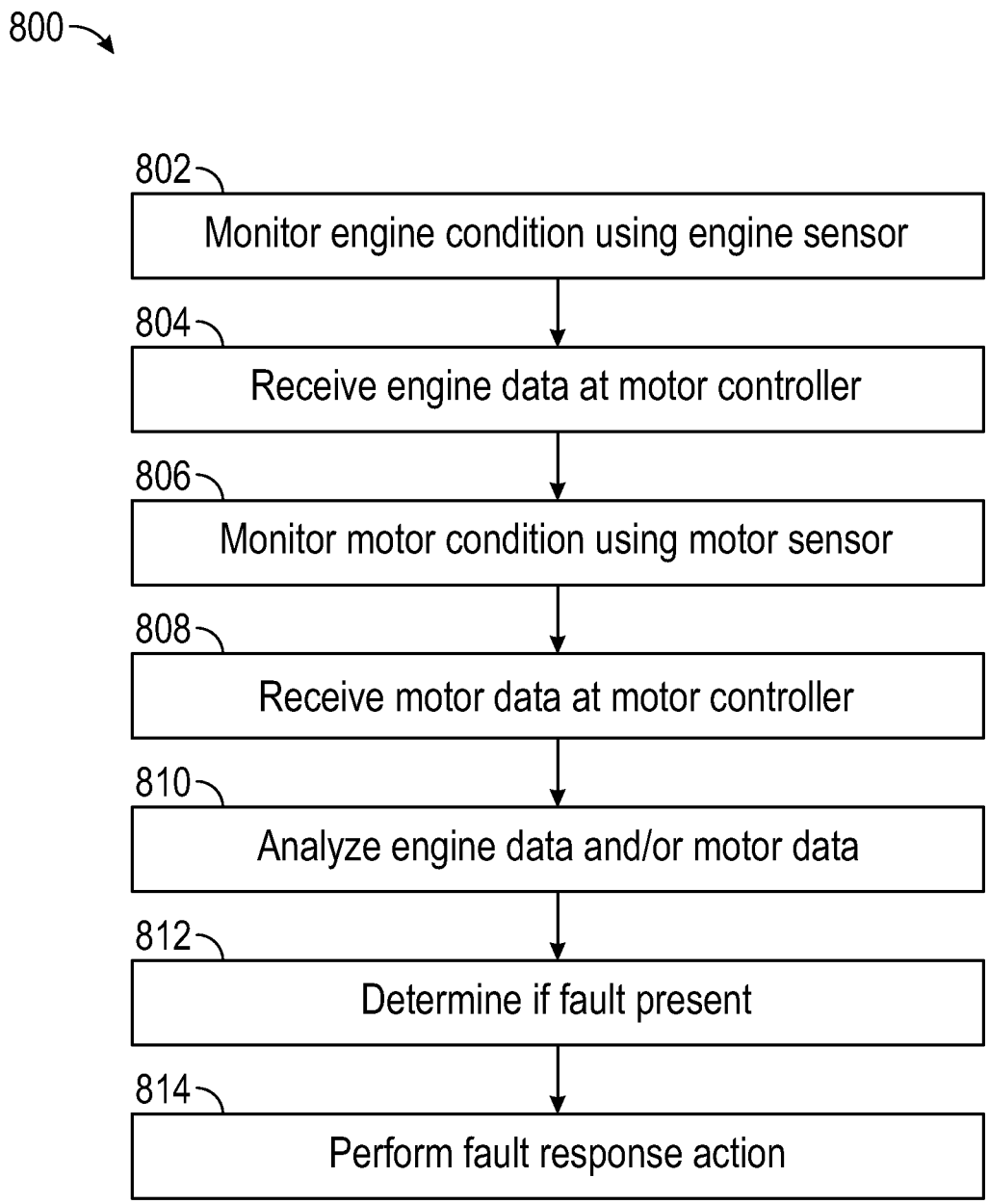
FIG. 8 is a flow process for monitoring health of a gas turbine engine using an electrical power system in accordance with an embodiment of the present disclosure.

Turning now to FIG. 8, a flow process 800 in accordance with an embodiment of the present disclosure is shown. The flow process 800 may be performed using a motor controller that is arranged in communication with or is part of an electrical power system onboard an aircraft. The aircraft may have a hybrid power system that employs an engine core having one or more shafts or spools and the electrical power system may be configured in operable connection with the one or more shafts in order to impart power to the shaft(s) and/or extract power from the shaft(s), such as shown and described above. The engine core and electrical power system may be part of an engine fault electric machine detection system, such as described above.

At block 802, one or more engine conditions are monitored using one or more engine sensors. The engine sensors may be configured to monitor rotational speeds of one or more shafts of the engine core. The engine sensors may also, or alternatively, include other types of sensors, including, but not limited to torque sensors, temperature sensors, pressure sensors, etc. The engine sensors may be configured to obtain engine data and transmit such data to a motor controller of the electrical power system.

At block 804, the engine data is received at a motor controller. The motor controller is part of the electrical power system. In some embodiments, the motor controller is integrated into an electric machine. In other embodiments, the motor controller may be a separate component that is electrically and operably connected to the electric machine. The motor controller can include one or more control elements such as printed circuit boards, processes, memory components, electrical communication components, and the like.

At block 806, one or more motor conditions are monitored using one or more motor sensors. The motor sensors may be electrical sensors configured to monitor electrical current, voltage, or the like within the electrical power system and/or may include speed sensors configured to monitor a rotational speed of a shaft of the electric machine. The motor sensors are configured to generate motor data associated with the motor condition(s).

At block 808, the motor data is transmitted to and received by the motor controller.

At block 810, the motor controller is configured to analyze the received engine data and/or the received motor data. For example, a rotational speed of one or more shafts may be compared against a rotational speed of the electric machine (e.g., FIGS. 5A-5C). In other embodiments, if only properties of the electrical power system are monitored (i.e., no engine sensors/engine data), the motor controller may be configured to analyze such data for specific events, such as peaks in an electrical current analysis (e.g., FIGS. 6A-6E). As such, in some embodiments, blocks 802-804 may be omitted or may be performed in separate logic loops, where one process is for primary indicators (comparison of engine data with motor data) and a second process is for secondary indicators (analyzing motor data alone). In some embodiments, the analysis may include performing Fast Fourier Transform (FFT) on the received signals to determine if a fault is present. Such FFT may be used when comparing the motor data and the engine data, for example.

At block 812, a determination is made whether a fault is detected. As used herein, a fault is either a failure or an indicator that a component or operational property of the hybrid electric turbine engine is subject to wear, fatigue, degradation, or the like.

At block 814, if a fault is detected at block 812, a fault response action is performed. The fault response action may involve various actions, including, but not limited to, generating a notification in a cockpit to notify an operator (e.g., pilot), restricting operational speeds and/or gears, causing the electric machine to input additional power into the shaft(s) to ensure continued operation for flight, or the like. Other corrective actions or fault response actions may include, without limitation, a maintenance action, shutdown of the engine, or other action that may be specific to the engine configuration and flight operations of an associated aircraft. For example, in one non-limiting embodiment, the fault response action may be a "response signal" that is a communication to a FADEC to limit operation of engine (e.g., limit operational speeds or the like). In another embodiment, or in combination therewith, the fault response action includes generating a notification to be displayed in a cockpit to inform a pilot or other operator regarding the fault.

In some embodiments, the engine fault electric machine detection systems may be configured to monitor only the electrical power system and characteristics thereof. In such embodiments, secondary indicators of faults are monitored. In other embodiments, both the electrical power system and the engine core are monitored, and primary indicators of faults are monitored. In still other embodiments, both the electrical power system and the engine core are monitored and both primary and secondary indicators of faults are monitored.

Advantageously, embodiments of the present disclosure are directed to health monitoring of an engine core based on data collection and analysis at an electric motor controller of an electrical power system. Because such electrical power system may be operably coupled to one or more spools or shafts of the engine core, by analyzing electrical system data and/or comparing such data with engine data directly associated with the engine core, faults may be predicted and/or detected. Advantageously, primary and secondary indicators may be monitored to determine different types of faults, including, but not limited to, shaft failure, metering valve runaway, gear system wear, gear system failure, rub events, debris in core airfoil, bird strike, fan blade out.

The terminology used herein is for the purpose of describing particular embodiments only and is not intended to be limiting of the present disclosure. The terms "about" and/or "substantially" are intended to include the degree of error associated with measurement of the particular quantity based upon the equipment available at the time of filing the application. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for monitoring operation of a hybrid electric engine of an aircraft, the method comprising:
    monitoring a motor condition of an electrical power system associated with an engine condition using a motor sensor, wherein the electrical power system comprises an electric machine operably coupled to at least one shaft of an engine core, wherein the electric machine is configured to at least one of add power to the at least one shaft and extract power from the at least one shaft;
    receiving motor data from the motor sensor at a motor controller, wherein the motor controller is configured to control operation of, at least, the electric machine;
    analyzing the motor data to determine the presence of a fault in the engine core, wherein a natural frequency of operation is monitored and a fault is detected when a secondary peak frequency is detected that is different from the natural frequency; and
    when a fault is detected, performing a fault response action.

2. The method of claim 1, wherein the motor data comprises electrical current data and the associated engine condition is a health of a gear system that connects the electric machine to the at least one shaft.

3. The method of claim 2, wherein when the secondary peak frequency is below a threshold amplitude a first fault state is detected and if the secondary peak frequency is above the threshold amplitude a second fault state is detected, wherein the second fault state indicates a failure of the gear system.

4. The method of claim 1, further comprising:
    collecting engine data from at least one engine sensor onboard the engine core;
    receiving the engine data at the motor controller; and
    comparing the engine data with the motor data,
    wherein a fault is detected based on the comparison between the engine data and the motor data.

5. The method of claim 4, wherein the at least one engine sensor is configured to monitor a rotational speed of the at least one shaft and the engine data is the rotational speed of the at least one shaft.

6. The method of claim 5, wherein the motor data is a rotational speed of the electric machine, and the detection of a fault is based on comparison between the rotational speed of the at least one shaft and the rotational speed of the electric machine.

7. The method of claim 1, wherein the fault response action comprises generating a notification in a cockpit of the aircraft.

8. The method of claim 1, wherein the fault response action comprises limiting an operational envelope of the engine core.

* * * * *